United States Patent [19]

Williams et al.

[11] Patent Number: 5,728,180
[45] Date of Patent: Mar. 17, 1998

[54] ADSORBENT COMBINATIONS FOR ENHANCED REMOVAL OF SODIUM OXALATE FROM BAYER PROCESS SPENT LIQUOR

[75] Inventors: Fred S. Williams, Victoria, Tex.; Anthony J. Perrotta, Monroeville, Pa.

[73] Assignee: Aluminum Company of America, Pittsburgh, Pa.

[21] Appl. No.: 670,360

[22] Filed: Jun. 25, 1996

[51] Int. Cl.$^6$ ............................... C01F 7/36; C01F 7/08
[52] U.S. Cl. ................... 23/305 A; 423/121; 423/122; 423/130; 23/300
[58] Field of Search .......................... 423/121, 122, 423/127, 130, 131; 23/300, 305 A

[56] References Cited

U.S. PATENT DOCUMENTS

| | | |
|---|---|---|
| 3,899,571 | 8/1975 | Yamada et al. ............... 423/127 |
| 4,275,042 | 6/1981 | Lever ............................. 423/121 |
| 4,275,043 | 6/1981 | Gnyra ........................... 423/130 |
| 4,578,255 | 3/1986 | Roe et al. ..................... 423/121 |
| 5,284,634 | 2/1994 | Strominger et al. .......... 423/13 D |

FOREIGN PATENT DOCUMENTS 2160853  1/1986  United Kingdom ............. 423/121

*Primary Examiner*—Gary P. Straub
*Attorney, Agent, or Firm*—Glenn E. Klepac

[57] ABSTRACT

Sodium oxalate is precipitated from spent Bayer process liquor by mixture with a low total alkalinity (TA) sodium oxalate seed solution that has been treated with two or more adsorbents to remove organic poisons from the sodium oxalate. The adsorbents are preferably two different adsorbents selected from activated carbon, ESP dust, calcium oxide and magnesium oxide. Surprisingly, combination treatments with activated carbon and ESP dust are most effective even though ESP dust alone has little effect on oxalate removal.

9 Claims, 1 Drawing Sheet

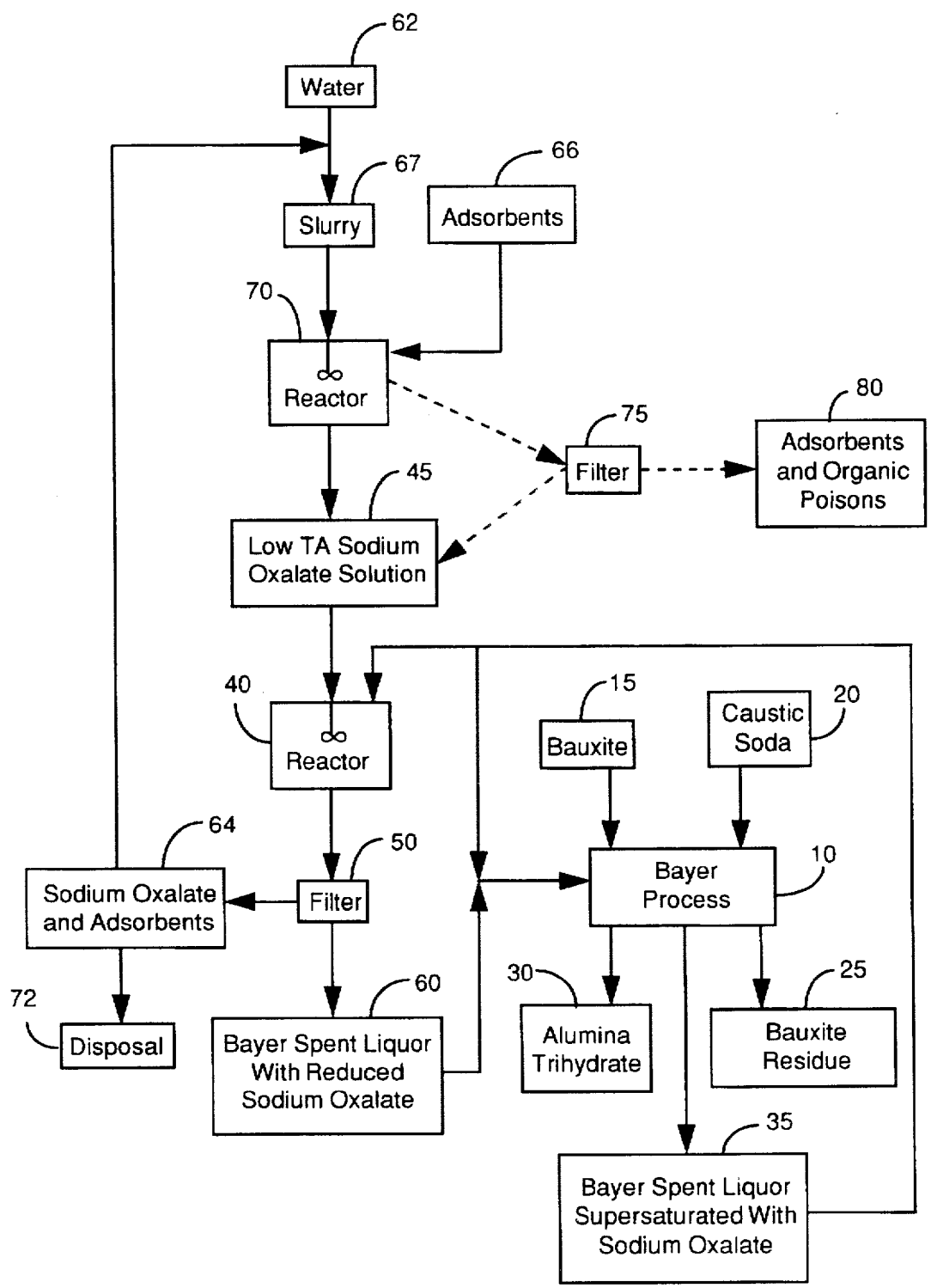
FIGURE

ADSORBENT COMBINATIONS FOR ENHANCED REMOVAL OF SODIUM OXALATE FROM BAYER PROCESS SPENT LIQUOR

FIELD OF THE INVENTION

The invention relates to production of alumina from bauxite and other ores containing aluminum compounds. More particularly, this invention relates to the removal of sodium oxalate from Bayer process spent liquor in order to improve the yield of alumina. The claimed process entails treating a sodium oxalate seed solution with two or more different adsorbents to remove organic poisons from the sodium oxalate.

BRIEF DESCRIPTION OF THE PRIOR ART

Aluminum-bearing ores such as bauxite ordinarily contain organic carbon in amounts of about 0.1 to 0.3 wt. % and occasionally as high as 0.6 wt. % when surface bauxite is mined. The organic carbon is present in the form of humates, lignin and cellulose. On digestion of this bauxite in the Bayer process, typically more than half of the organic carbon is extracted into the liquor. When the Bayer liquor is recycled, the concentration of organic substances and their degradation products builds up to an equilibrium level dependent upon organic carbon content of the bauxite and organic carbon losses during processing.

Some other sources of organic carbon in Bayer liquor include organic compounds added as flocculating agents and anti-foam agents. Such organic compounds represent only a small proportion of the total organic content so that these compounds and their breakdown products generally do not contribute significantly to the problems arising from organic carbon in Bayer liquor. The precursor organic materials oxidatively degrade in the Bayer process circuit to form formic, acetic and oxalic acids which are neutralized by sodium hydroxide to their sodium salts.

Sodium oxalate gives rise to problems in the Bayer process because of its limited solubility in solutions containing sodium hydroxide. When the concentration of sodium oxalate builds upon to a supersaturated condition, it coprecipitates with the alumina trihydrate and interferes with agglomeration which results in a rise in alumina trihydrate fines during precipitation. This can cause problems in separating the fine alumina crystals from the liquor, resulting in more alumina being recycled back to digestion and thereby decreasing the overall yield. This reduction in agglomeration can also force a change in precipitation operating conditions to counteract the increase in fines, thereby lowering plant liquor yields and overall plant production levels.

In view of the problems identified above, it is desirable to remove at least a portion of the sodium oxalate from the liquor stream. This depresses sodium oxalate accumulation in the liquor and reduces its coprecipitation with the alumina trihydrate crystals.

Organic matter in the liquor has the indirect effect of inhibiting precipitation of sodium oxalate from supersaturated solutions. The sodium oxalate concentration can substantially exceed saturation. Although this delays the onset of sodium oxalate precipitation, sudden crystallization of sodium oxalate can give rise to even greater problems. The precipitation inhibiting effect of organic matter makes it difficult to control the concentration of sodium oxalate and its undesirable coprecipitation with alumina.

Several methods have been proposed in the prior art to reduce sodium oxalate concentrations in Bayer process liquor. For example, Yamada et al. U.S. Pat. No. 3,899,571 provides for the removal of sodium oxalate by addition of sodium oxalate seed crystals to a spent liquor in order to precipitate organic substances, mainly sodium oxalate, which are then removed from the spent liquor.

Gnyra U.S. Pat. No. 4,275,043 describes the removal of oxalate, generally as a disodium salt, from Bayer process liquor by treating the liquor with an adsorbent which is preferably activated carbon. The adsorbent removes sufficient humic matter from the liquor to destabilize the sodium oxalate and cause it to precipitate. Gnyra also identified activated alumina and activated clays as suitable adsorbents for humic matter.

Harrison Australian Application No. 32978/95 filed Sep. 29, 1995 claims a process wherein sodium oxalate derived from Bayer process liquor is dissolved in water to form a low alkalinity solution which is then subjected to an organics removal step to remove organic poisons contributed by the oxalate. The treated solution is useful for crystallizing sodium oxalate from Bayer process solutions. Yield is enhanced, compared with crystallization carded out using sodium oxalate solutions not subjected to an organic poisons removal step. Harrison discloses several means for removing organic poisons, including ultra-filtration and adsorbents such as activated charcoal, magnesium hydroxide and calcium hydroxide.

While each of the prior art oxalate removal methods has met with some limited success, there still remains a need for an efficient and economical process capable of removing sodium oxalate from Bayer process liquor.

It is a principal objective of the present invention to provide an improved process for removing sodium oxalate from Bayer process liquor, using at least two different adsorbents to adsorb poisons from sodium oxalate seed.

Additional objectives and advantages of our invention will become apparent to persons skilled in the art from the detailed description that follows.

SUMMARY OF THE INVENTION

In accordance with the present invention, there is provided a process for removing sodium oxalate from Bayer process spent liquor. The spent liquor contains caustic soda, sodium carbonate and alumina. It has a total alkali (TA) content (expressed as sodium carbonate equivalent) of greater than about 50 g/L. The TA content is more commonly in the range of about 100–400 g/L, and preferably about 230–360 g/L. The alumina/caustic ratio ($Al_2O_3$/$Na_2CO_3$) is about 0.25–0.50. The spent liquor typically has a temperature in the range of about 30°–110° C. More preferably, the spent liquor is at a temperature of about 40°–90° C.

The spent liquor is generally supersaturated with sodium oxalate. It is generally recognized that organic contaminants in the solution stabilize sodium oxalate so that it does not precipitate even at concentrations greatly exceeding its equilibrium concentration.

The spent liquor is recycled to the Bayer process because it contains caustic soda, sodium carbonate and alumina. However, sodium oxalate must be removed from the spent liquor in order to avoid detrimental effects during the precipitation of aluminum hydroxide. Accordingly, we have developed a process for removing the sodium oxalate from spent liquor which includes the following steps:

(a) preparing a sodium oxalate solution by dissolving solid sodium oxalate contaminated with organic poisons in an aqueous solvent having a TA level of less than about 75 g/L, (b) contacting the sodium oxalate solution with at least two different adsorbents to adsorb the poisons onto the adsorbents, and (c) mixing the sodium oxalate solution with Bayer process spent liquor, thereby precipitating sodium oxalate from the spent liquor.

The aqueous solvent may be water or Bayer process lake water. The solvent preferably has a TA level of less than about 5 g/L and the TA level is optimally about zero.

The adsorbents are activated carbon, electrostatic precipitator dust (ESP dust), calcium oxide and magnesium oxide. Preferably, one of the adsorbents is activated carbon. A combination of activated carbon, magnesium oxide and ESP dust is particularly preferred.

Contaminated solid sodium oxalate used in making the sodium oxalate solution may be obtained by precipitating sodium oxalate from the spent Bayer liquor. Sodium oxalate from this source should be concentrated, for example by filtration, to remove residual liquor before it is dissolved in the aqueous solvent. The solvent should have a temperature in the range of about 25°–145° C., preferably about 80°–110° C.

Optionally, the adsorbents may be separated from the sodium oxalate solution after contacting the solution to adsorb the poisons.

BRIEF DESCRIPTION OF THE DRAWING

The sole Figure is a flow sheet diagram, showing the sodium oxalate removal process of our invention.

DETAILED DESCRIPTION OF A PREFERRED EMBODIMENT

As shown in the Figure, the sodium oxalate removal process is used for removing sodium oxalate from spent process liquor generated in the Bayer process 10. The Bayer process is a commonly used means for producing alumina trihydrate. Bauxite 15 or other aluminum-containing ore is digested with a solution containing caustic soda 20 at an elevated temperature. The digestion results in a slurry containing alumina in solution in the form of sodium aluminate together with other soluble compounds including sodium oxalate, and an insoluble residue 25 called "bauxite residue" or "red mud".

To recover alumina values from the slurry, the red mud is separated, generally by settling and/or by filtration. The filtrate or liquor is a supersaturated solution of sodium aluminate from which alumina trihydrate 30 is precipitated by seeding, cooling or other methods. The filtrate 35 from this precipitation, called "spent liquor", is supersaturated with sodium oxalate. In order to avoid a build-up of sodium oxalate in the Bayer process 10, a portion of the spent liquor 35 is sent to a first reactor 40 where sodium oxalate is precipitated by contacting the spent liquor 35 with a low total alkalinity (TA) sodium oxalate solution 45. The resulting slurry is sent to a filter 50 where precipitated sodium oxalate 55 is separated from the liquor 60. This spent liquor 60, having a lowered sodium oxalate content, is then recycled to the Bayer process 10.

We have found that the yield of sodium oxalate precipitated from Bayer spent liquor is improved by using as seed material a low TA sodium oxalate solution 45 containing sodium oxalate which has been treated with two or more adsorbents to remove organic poisons. The low TA sodium oxalate solution 45 is obtained by mixing water 62 with the separated oxalate solids 64, for example by using water to slurry solids off a filter 50. Two or more adsorbents 66 are mixed with the resultant slurry 67 in a second reactor 70. In a preferred embodiment, the sodium oxalate 64 is mixed with some spent adsorbents contaminated with adsorbed organic poisons. To maintain a constant seed solution inventory, a portion of the sodium oxalate-spent adsorbent mixture 64 is sent to disposal 72. The reactor 70 is preferably maintained at a temperature of about 90° C. The adsorbents 66 are preferably activated carbon, magnesium oxide and ESP dust but may also be activated carbon and ESP dust or activated carbon and magnesium oxide.

A slurry from the second reactor 70 may be transferred to a filter 75 where the adsorbents and organic poisons 80 are removed. The filtrate is a low TA sodium oxalate solution 45 having a reduced concentration of organic poisons. The solution 45 is transferred to the first reactor 40 where it is mixed with incoming spent Bayer liquor 35 that is supersaturated with sodium oxalate. The first reactor 40 is preferably maintained at a temperature of about 57° C.

The following set of experiments confirmed that the process of the present invention increases removal of sodium oxalate from Bayer process spent liquor compared with the prior art. A sample of spent liquor containing 3.98 g/L sodium oxalate was obtained and held in an oven maintained at a temperature above 60° C. A poisoned oxalate seed solution was made up by dissolving 450 grams of plant produced sodium oxalate seed in two liters of deionized water and heating to 90° C. for 30 minutes. The sodium oxalate seed had been precipitated from spent Bayer process liquor.

We treated 50 cc portions of the oxalate seed solution with several different adsorbents, both singly and consecutively. The activated carbon was grade WPX activated carbon from Calgon Carbon Company of Pittsburgh, Pa. The CaO was a commercial grade calcined lime. One sample of ESP dust, designated ESP Dust (I) was collected by an electrostatic precipitator from the exhaust gas of a gas-fired alumina calciner. A second sample of ESP dust, designated ESP Dust (II), was collected by an electrostatic precipitator from the exhaust gas of an oil-fired alumina calciner. The Filter Aid adsorbent was a tricalcium aluminate formed by reacting Bayer process spent liquor with lime. The MgO is sold by Martin Marietta Corporation under the trademark "Magchem 50".

The adsorbents were each added to 50 cc portions of the poisoned oxalate seed solution and placed in 250 cc bottles held for at least 10 minutes in a 90° C. rolling oven. When two adsorbents were used, the first adsorbent was mixed with the solution for at least 10 minutes before adding the second adsorbent. After mixing, the sodium oxalate seed solutions were combined in one liter bottles with 500 cc of Bayer plant evaporated spent liquor containing 3.98 g/L sodium oxalate.

Precipitation was allowed to continue for one hour at 57° C. The slurry was filtered and the filtrate was analyzed for dissolved oxalate. The filter cakes were discarded. Results of the analyses are shown in the following tables.

TABLE 1

Effect of Single Adsorbent Treatment on Sodium
Oxalate Removal from Bayer Process Spent Liquor

| Adsorbent | Adsorbent Quantity (gm) | Treated Liquor Dissolved Oxalate (g/L) |
|---|---|---|
| None | 0 | 7.17 |
| Activated Carbon | 2 | 2.18 |
| Activated Carbon | 4 | 2.17 |
| ESP Dust (I) | 2 | 7.07 |
| ESP Dust (I) | 4 | 7.14 |
| ESP Dust (II) | 2 | 6.92 |
| ESP Dust (II) | 4 | 7.18 |
| CaO | 4 | 2.68 |
| MgO | 2 | 2.45 |
| MgO | 4 | 2.31 |
| Filter Aid | 4 | 5.68 |

The results in Table 1 show that activated carbon alone was most effective in reducing dissolved oxalate content. Treatment with CaO and MgO also achieved substantial reductions. Both types of ESP dust had very little effect on the dissolved oxalate content. The values of oxalate in solution above the original 3.98 g/L sodium oxalate concentration are a result of the stabilizing effect of organics which have gone into solution from the poisoned seed.

TABLE 2

Effect of Double Adsorbent Treatment on Sodium
Oxalate Removal from Bayer Process Spent Liquor

| First Adsorbent (2 gm) | Second Adsorbent (2 gm) | Treated Liquor Dissolved Oxalate (g/L) |
|---|---|---|
| None | None | 7.17 |
| Activated Carbon | CaO | 2.20 |
| Activated Carbon | ESP Dust (I) | 2.01 |
| Activated Carbon | Filter Aid | 2.26 |
| Activated Carbon | MgO | 2.14 |
| Activated Carbon | ESP Dust (II) | 1.92 |
| CaO | Activated Carbon | 2.03 |
| CaO | ESP Dust (I) | 3.55 |
| CaO | Filter Aid | 3.31 |
| CaO | MgO | 2.41 |
| CaO | ESP Dust (II) | 4.38 |
| ESP Dust (I) | Activated Carbon | 1.91 |
| ESP Dust (I) | CaO | 3.70 |
| ESP Dust (I) | Filter Aid | 5.69 |
| ESP Dust (I) | MgO | 2.05 |
| ESP Dust (I) | ESP Dust (II) | 5.62 |
| Filter Aid | Activated Carbon | 2.29 |
| Filter Aid | CaO | 3.68 |
| Filter Aid | ESP Dust (I) | 6.07 |
| Filter Aid | MgO | 2.75 |
| Filter Aid | ESP Dust (II) | 7.24 |
| MgO | Activated Carbon | 2.01 |
| MgO | CaO | 3.26 |
| MgO | ESP Dust (I) | 2.13 |
| MgO | Filter Aid | 2.58 |
| MgO | ESP Dust (II) | 2.08 |
| ESP Dust (II) | Activated Carbon | 2.04 |
| ESP Dust (II) | CaO | 3.97 |
| ESP Dust (II) | ESP Dust (I) | 6.02 |
| ESP Dust (II) | Filter Aid | 7.38 |
| ESP Dust (II) | MgO | 2.26 |

The results in Table 2 show that combination treatments with activated carbon and ESP dust were most effective in reducing oxalate content, even though the ESP dust alone had very little effect. Some combination treatments with activated carbon and MgO or activated carbon and CaO also were effective.

The foregoing detailed description of our invention has been made with reference to some particularly preferred embodiments. Persons skilled in the art will understand that numerous changes and modifications can be made in the process described without departing from the spirit and scope of the following claims.

What is claimed is:

1. A process for removing sodium oxalate from Bayer process spent liquor having a total alkali (TA) level of about 100 g/L or more, comprising:
   (a) preparing a sodium oxalate solution by dissolving solid sodium oxalate contaminated with organic poisons in an aqueous solvent having a TA level of less than about 75 g/L, said organic poisons comprising at least one degradation product of at least one organic compound selected from the group consisting of humates, lignin, cellulose, organic flocculating agents and organic anti-foam agents, said organic poisons inhibiting precipitation of sodium oxalate from Bayer process spent liquor;
   (b) contacting said sodium oxalate solution with at least two different adsorbents selected from the group consisting of activated carbon, dust collected by an electrostatic precipitator from exhaust gas of an alumina calciner (ESP dust), calcium oxide and magnesium oxide, thereby to adsorb said poisons from said solution; and
   (c) mixing said sodium oxalate solution with Bayer process spent liquor supersaturated with dissolved sodium oxalate and having a total alkali level of about 100 g/L or more, thereby to precipitate sodium oxalate from said spent liquor.

2. The process of claim 1 wherein said adsorbents comprise activated carbon and at least one adsorbent selected from dust collected by an electrostatic precipitator from exhaust gas of an alumina calciner (ESP dust), calcium oxide and magnesium oxide.

3. The process of claim 1 wherein said adsorbents comprise activated carbon and dust collected by an electrostatic precipitator from exhaust gas of an alumina calciner (ESP dust).

4. The process of claim 1 wherein said aqueous solvent is water having a TA level of less than about 5 g/L.

5. The process of claim 1 wherein the solid sodium oxalate of step (a) is derived from the precipitation of step (c).

6. The process of claim 5 further comprising:
   (d) filtering the precipitated sodium oxalate of step (c), thereby to remove residual Bayer spent liquor.

7. The process of claim 1 wherein the step of dissolving the contaminated sodium oxalate is conducted at a temperature of about 25°–145° C.

8. The process of claim 1 wherein the step of dissolving the contaminated sodium oxalate is conducted at a temperature of about 80°–110° C.

9. A process for removing sodium oxalate from Bayer process spent liquor wherein said spent liquor has a total alkali (TA) level in the range of about 100–400 g/L, comprising:
   (a) preparing a sodium oxalate solution by dissolving solid sodium oxalate contaminated with organic poisons in water having a TA level of less than about 5 g/L, said organic poisons comprising at least one degradation product of at least one organic compound selected from the group consisting of humates, lignin, cellulose, organic flocculating agents and organic anti-foam agents, said organic poisons inhibiting precipitation of sodium oxalate from Bayer process spent liquor;

(b) contacting said sodium oxalate solution with activated carbon and at least one other adsorbent selected from the group consisting of dust collected by an electrostatic precipitator from exhaust gas of an alumina calciner (ESP dust), calcium oxide and magnesium oxide, thereby to adsorb said poisons onto the activated carbon and the other adsorbent; and (c) mixing said sodium oxalate solution with Bayer process spent liquor supersaturated with dissolved sodium oxalate thereby to precipitate sodium oxalate from said spent liquor.

* * * * *